Dec. 1, 1964 — C. WAGNER — 3,159,095

DEEP FAT PRESSURE FRYER

Filed July 10, 1961 — 2 Sheets-Sheet 1

INVENTOR.
CHESTER WAGNER
BY
ATTORNEYS

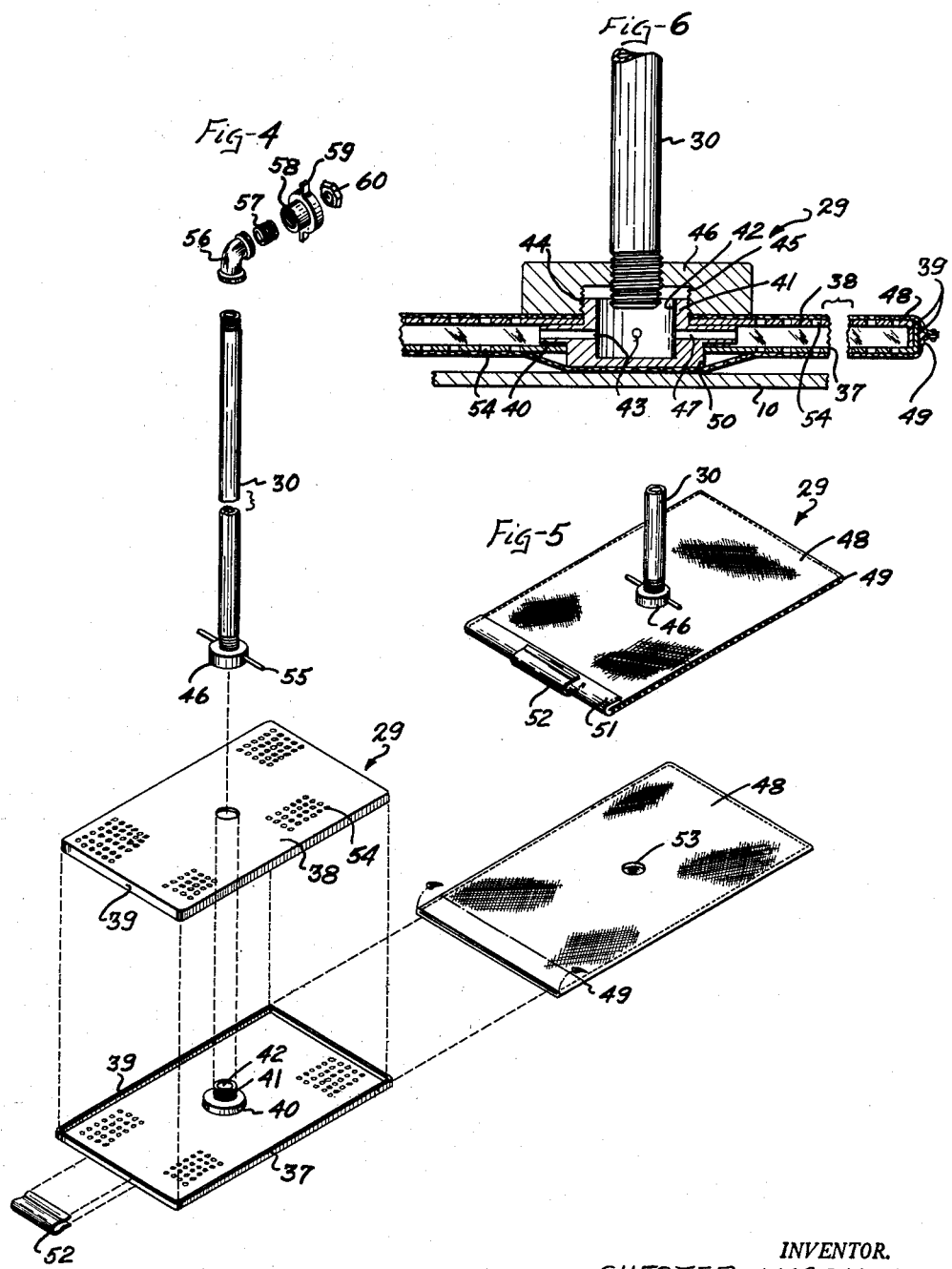

United States Patent Office 3,159,095
Patented Dec. 1, 1964

3,159,095
DEEP FAT PRESSURE FRYER
Chester Wagner, 217 N. Barron St., Eaton, Ohio
Filed July 10, 1961, Ser. No. 123,033
1 Claim. (Cl. 99—408)

The present invention relates to deep fat pressure fryers of the character shown and described in my Patents No. 2,778,736 and 2,914,063.

Fryers of this character employ heated deep fat and, in addition, the simultaneous use of steam pressure for which the moisture is obtained solely from the food being prepared. The latter, which may comprise chicken, meat, fish, etc., are first coated with a suitable form of meal or sauce which gives the food a light, flaky crust of brownish color upon being fried.

However, it has been found that as the frying process proceeds bits of the coating material, and sometimes bits of the food itself, drop off into the fat. As the fat is used over again for successive batches of food, these particles become re-cooked until they take on a burnt appearance. The over-browned particles deposit themselves on the food being presently fried, tending to detract not only from the appearance of the food, but also from the flavor. When such a condition happens, the usual procedure is to dump the contaminated oil and replace it—an expensive and time-consuming operation. One of the objects of my invention, in brief, is to provide, as an integral and built-in part of the fryer, a fat cleansing filter apparatus which can be used with very little manipulation by the operator and which serves most effectively to rid the fat of any particles that might deleteriously affect the appearance or taste of the cooked food.

One of the objects of my invention is to improve, in general, the operation of the deep fat pressure fryer of the type described in my patents aforesaid with a view to enhancing the quality of the fried product, decreasing the time in which the food, particularly chicken, can be adequately fried and ready to serve and also deriving the optimum advantage of delectableness and palatability of the fried chicken or other food.

Other objects and features will be apparent as the specification is perused in connection with the accompanying drawings in which—

FIGURE 4 is an exploded view in perspective of the oil filter itself which is employed for cleaning the fat.

FIGURE 5 shows the manner in which the parts of the filter are secured together when in use.

FIGURE 6 represents a longitudinal sectional view but with the outgoing pipe in elevation of the filter unit.

Figure 1:
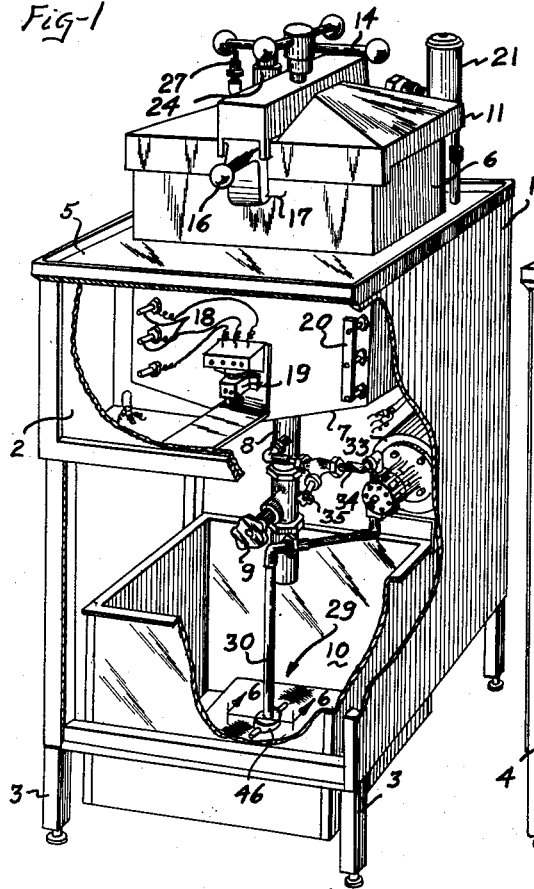
FIGURE 1 is a front view in perspective and partly broken away of the fryer improved in accordance with my invention.
Figure 2:
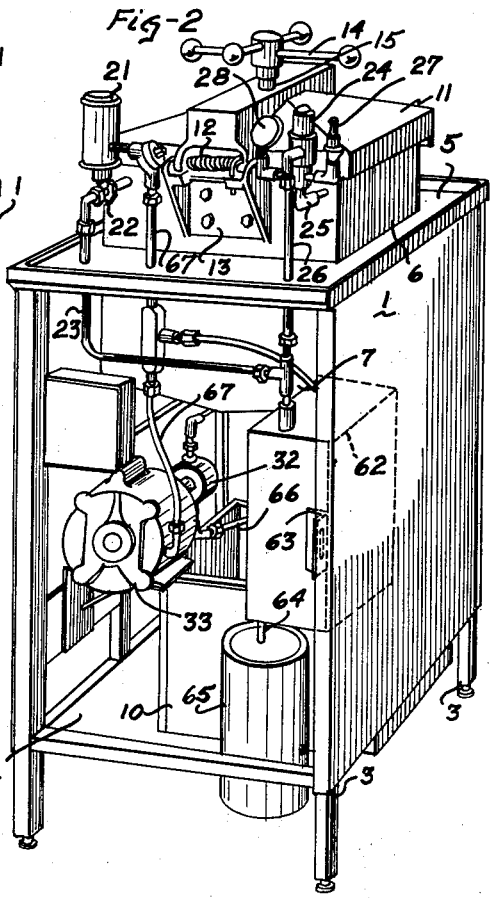
FIGURE 2 is a rear view also in perspective of the improved fryer.

Referring more particularly to FIGURES 1 and 2, reference character 1 designates the two opposite sides of the fryer. These sides may be conveniently made of sheet steel or other suitable metal. The front of the fryer 2 may have two sections as seen in FIGURE 1. The upper section constitutes a panel (not shown) on which are mounted an electric timer and an electric thermostat, as well as the various operating switches. The lower part of the front may constitute a door (not shown) which is hingedly mounted in order to give free access to the interior of the fryer. The fryer is supported on legs 3. The rear of the fryer is preferably left open as indicated at 4 in order that the apparatus within the device can be inspected and attended to from time to time.

There is a platform 5 extending over the top of the fryer and upstanding from the platform there is a rectangular pot or receptacle 6 which also extends through the platform 5 to a considerable distance below the top, as indicated at 7. The bottom of the fryer converges inwardly and downwardly, and extending from the lowermost portion of the pot there is a rigidly mounted pipe 8 which communicates with the interior of the pot. This pipe constitutes a drain opening through which the fat can flow under conditions which will be described hereinafter. There is a main valve 9 in the drain pipe for closing the latter off when it is desired to retain the fat within the pot. Directly below the drain pipe 8 there is an open-top box or compartment 10 for receiving the oil as it is dropped through the pipe 8 when the valve 9 is open. This box 10 preferably rests on the floor and is contained within the upright frame members of the fryer.

The top of the rectangular pot 6 is closed by a lid 11 hinged as indicated at 12 (FIGURE 2) to a suitable bracket 13. The lid is adapted to be hermetically sealed by means of a wheel having two sets of bars 14 at right angles to one another. These bars communicate through a screw 15 which operates a clamping device (not shown) for hermetically sealing the lid 11 against the top of the pot when the bar-wheel 14 is rotated. There is also a hand-operated lift and latching device 16 which clamps itself against a lug 17 formed on the pot 6. The mechanism is such that in order to close the lid and clamp it, the latch 16 is first pressed downwardly and thereafter a hermetical seal is effected at the bar-wheel 14. To open the lid it is first necessary to rotate the bar-wheel 14 in order to relieve the hermetical seal, after which the hand-operated member can be released and the lid lifted accordingly.

Within the interior of the front portion 2 of the fryer there is the usual inlet sockets 18 from which cables are taken to a heating and control system indicated at 19. The heating units contained at the lower end of the pot 6 are brought out for suitable connections to terminals indicated collectively at 20. These heating units preferably constitute electrical resistances; however, if desired, gas jets can also be employed.

In practice, the pot 6 is filled about two-thirds full with a high-grade cooking oil or fat and an electrical connection made at the terminals or sockets 18 with a suitable source of electrical energy. When the fat has reached a sufficiently high temperature, the food, chicken, meat, fish or potatoes, is then introduced. It is preferred that the food be allowed to brown slightly with the lid 11 open, at least until the last piece of the food has been dropped into the fat. The oil completely submerges the food at all times. This preliminary browning process, i.e., with the lid open, tends to harden the skin of the chicken or other meat so that the pieces do not stick together. Thereafter, in a short time, the lid is closed by pulling the latch member 16 downwardly, causing the clamping effect at 17, and thereafter the wheel 14 is turned hermetically to seal the lid. Continued heating will cause the food within the fat to give up its natural moisture, which is immediately turned into steam under pressure. I have found, in accordance with the inventions set forth in my aforesaid patents, that the optimum results are obtained by maintaining the oil in the container at about 310° to 325° F. and the pressure of the steam up to about 15 pounds per square inch. The time taken in the case of chicken after the lid has been hermetically sealed and at the temperature and pressure noted, is from five to seven minutes.

Upon completion of the frying operation, the operator presses a button which operates a solenoid valve 21, the latter serving to release the steam pressure within the pot through a valve 22 and an escape pipe 23. The wheel 14 can then be turned due to the absence of pressure within the pot, after which the latch 16 can be released from the lug 17 and the lid 11 lifted in order to remove the chicken or other food from the pot. As the lid is moved upwardly on its hinge, any excess steam within the pot tends to adhere to the inside surface of the lid and to form droplets of water on the surface thereof. A gutter (not shown) is provided at the lower or hinged end of the lid into which the condensed moisture flows. There is an escape pipe which extends from the gutter to the pipe 23.

The pressure referred to hereinbefore is determined by the setting of a dead-weight back pressure valve 24, which communicates through a pipe 25 with the interior of the pot and any water that finds its way into the valve passes through a pipe 26. A safety valve 27 is taken out of the dead-weight valve 24 and, in addition, there is a pressure gauge 28 also in communication with the interior of the pot 6 by a connection from the base of the dead-weight valve.

*Fat Cleansing System*

The fat or oil in the container 6 is normally used over and over again not only on account of the expense of this high-grade material, but also for the reason that it constitutes a troublesome job to empty the receptacle of the fat and to provide fresh material. Consequently, after the fat has been used for frying two or more batches of chicken, meat or fish, it has been found that particles of burnt substance appear within the fat. This substance may be particles of the dredging material or coating applied to the raw chicken or perhaps pieces of the chicken itself which have become detached from the meat and therefore are not removed when the batch as a whole is taken out of the pot. Subsequent frying operations, as when a second or third batch of meat is placed in the fryer, continue to cook these solid particles more and more until they become quite hard and in all probability will attach themselves to the meat, giving the latter not only a spotted appearance, but also detracting from its delectable flavor. The general procedure in cases of this kind would be for the operator to dump the oil by opening the valve 9 and then closing the valve to permit a fresh supply of oil or fat to be introduced into the receptacle. This fat would necessarily have to be heated from a cool condition and the time and labor consumed would be considerable even without the added expense. In accordance with one feature of my invention there is provided a cleansing or filtering system and apparatus by which the foreign particles in the fat are semi-automatically removed from the fat without any appreciable loss of the heat in the fat so that frying can proceed with little or no interruption and there is present in the receptacle a full charge of clean fat.

Figure 3:
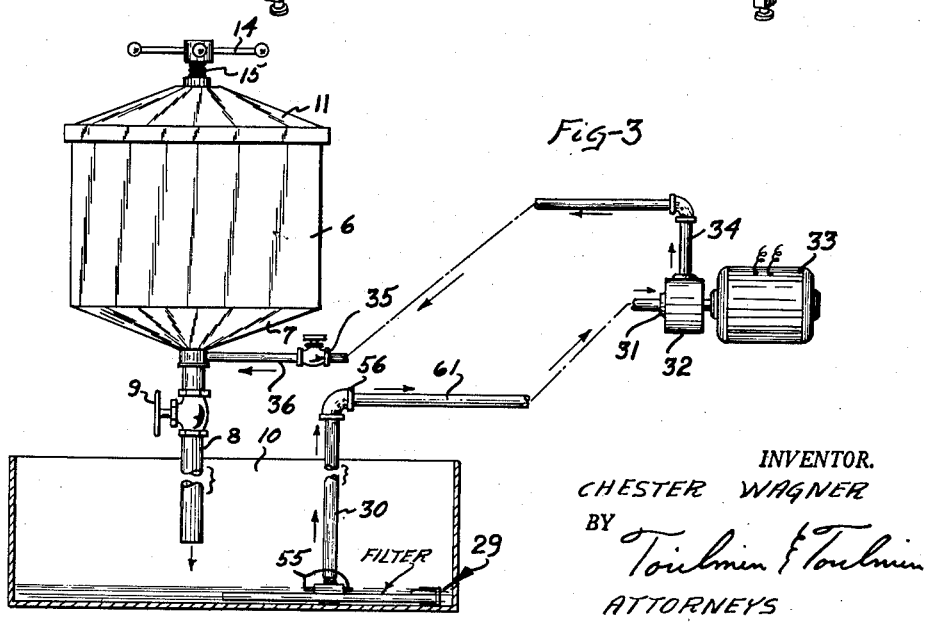
FIGURE 3 represents a view partly schematic of the improved fat filtering system for rendering the oil in the fryer free of deleterious particles.

Referring to FIGURE 3, there is placed at the bottom of the compartment 10 a filtering apparatus generally indicated at 29, of which the details are shown in FIGURES 4, 5 and 6. This filter is so arranged that all the fat delivered by the drain pipe 8 must flow through the filter in order to get back into the receptacle 6. As shown, there is an outlet pipe 30 extending upwardly out of the filter. This pipe enters the eye 31 of a pump 32, which is actuated by a motor 33. From the pump a pipe 34 extends to a valve 35, the clean oil passing through the pipe 36 into the upper portion of the drain pipe 8 but above the valve 9.

The operation of the filtering or cleansing system can be readily seen in FIGURE 3. Assuming that the receptacle is about two-thirds filled with oil or fat that has been used for successive batches of food and, therefore, contains particles of foreign and/or fried material, the valve 9 is first opened but with the valve 35 closed. The oil within the receptacle is thus dumped into the box or compartment 10. The valve 9 is then closed. The pump 32 is started and the valve 35 opened at the same time. The entire body of oil within the box is caused to flow through the filter 29 by the suction effect of the pump up through the pipe 30, through the pump, then through the pipe 34 and through the valve 35 into the lower end of the receptacle 6 through the upper end of the drain pipe 8. Since the valve 9 is closed none of the returned oil or fat will flow downwardly through the drainpipe. When all of the oil has passed through the filter, i.e., when the box 10 is empty of the oil, the pump is stopped and the valve 35 closed, whereupon the oil, still in its heated condition, is ready to receive the next batch of food.

The particles that have been filtered out of the oil cling to a removable envelope of filter paper as will be explained hereinafter and the paper can be changed when necessary to provide ready access to the oil but obstructing the passage of any solid foreign material. The entire filtering procedure can be quickly accomplished with very little interruption to the frying operation and the oil or fat is still in a fairly hot conditon when it is returned in a clean state to the receptacle.

The details of the filter are shown in FIGURES 4, 5 and 6. The main box of the apparatus is formed of two opositely disposed trays 37, 38 having flanges 39 around their outer edges and perforated throughout their entire surfaces. The trays are of such a dimension that the upper tray 38 will fit snugly at all four edges within the flanges of the bottom tray 37. This effect can be seen in FIGURE 6. The outer edges of the trays are held at a suitable distance apart by means of the abutting surfaces of the respective flanges 39. The middle or central portion of the trays contains a circular plate member 40, which is provided with an upstanding hub 41. The latter is counterbored as indicated at 42 (FIGURE 6) and there are angularly arranged radially extending openings 43 extending from the counterbore 42 outwardly to the periphery of the circular plate. The hub 41 is provided with screw threads 44 for receiving the interior threads 45 of a round counterbored plate 46. A pipe 30 is threaded into the plate 46. Thus, there is ready access for the oil or fat contained between the two trays to flow through the openings 47, thence up through the counterbore 42 to the pipe 30.

The filtering function of the device is provided by means of an envelope of filter paper 48 of any suitable and well-known type, which is formed as a bag, indicated by a closure 49. The bag stretches over a projection 50 which extends downwardly from the circular plate 40. The open end of the filter bag appearing at the left-hand end (FIGURE 5) is folded as indicated at 51 so as to close the open end of the bag, and is held in this closed position by means of a spring clamp 52. The upper side of the filter bag is provided with an opening 53 for loosely receiving the hub 41 so that when the plate 46 is tightened down on the hub the lower flat surface of the plate holds the upper portion of the filter envelope tightly against the upper plate member 38. The projection 50 securely presses the lower portion of the filter envelope against the bottom of the compartment or box 10 and, in addition, serves to space the lower portion of the filter envelope at a distance above the bottom of the box. Thus, the oil that collects above and below this two-part filter device must necessarily pass through the filter paper, thence through the apertures 54, through the radial openings 47 and up through the pipe 30 to trace the hydraulic circuit that has been described hereinbefore. Any foreign particles will obviously be caught along the outside surfaces of the flat filter bag and when this bag or envelope is fairly well clogged, it is a simple matter to replace the filter by removing the clamp 52, unfolding the left-hand edge 51 and then unscrewing the plate 46, which will allow the filter envelope to be slid to the right (FIGURE 6) and thus to be replaced by a new filter envelope. The plate 46 is provided with a pair of bars 55 for convenience in tightening and loosening the filter bag.

The pipe 30 terminates at the top in an elbow 56, which receives a short threaded piece of pipe 57 and the latter is loosely received by a tubular member 58 (FIGURE 4) to which is attached a dairy union 59. The union is counterbored (not shown) for receiving a nut 60, which threadedly engages the right-hand end of the pipe member 57. The union 59 makes a threaded connection with the horizontal pipe member 61 which is, therefore, in communication with the threaded pipe member 57. Thus, the hydraulic circuit is completed from the filter 29 through the pipe 30, the pipe 61 to the pump 32, pipe 34 through the valve 35 and pipe 36 to the drain opening in the pot 6. It is preferable that the drain pipe 8 drop its charge of oil at a position in the compartment 10 remote from the filter paper 48 so as not to injure the filter paper by the direct impact of the heated oil.

Condensing Apparatus

As stated hereinbefore, it is desirable that there be no more moisture within the pot during the frying operation than that given off by the food, chicken, meat, fish or potatoes being fried. Unless provision were made, the moisture given off by the previous batch of fried food would still remain in the pot and add to that given off by the successive batch. This would tend to raise the steam pressure for a given temperature above that which I have found to be absolutely necessary, with the result that the food becomes more steam-cooked than fried and thus loses its tenderness and flavor. Another feature of my invention, together with the improved oil cleansing apparatus heretofore described, lends great efficiency to the fryer in properly getting rid of the excess moisture or steam without any resultant back pressure.

As shown more particularly in FIGURE 2, there is provided a large condensing compartment 62 secured to the frame as indicated at 63 and having a short pipe 64 at the bottom through which condensed steam in the form of water flows into a jar 65. The latter can be emptied from time to time through the rear of the fryer. The pipe 23 leading from the solenoid valve 22 communicates with the compartment 62, as does also the pipe 26, which leads from the dead-weight pressure valve 24. It will be understood that each of the solenoid valve 22 and the pressure valve 24 communicates with the interior of the pot 6.

In operation, when the operator has determined that the proper frying time has expired, or, if desired, this can be determined automatically, he presses a switch which energizes the solenoid 21 and this allows steam within the pot 6 to pass through the valve 22 and the pipe 23 to the atmosphere in compartment 62. At the same time the wheel 14 is turned and the latch 16 is elevated in order to lift the lid 11. Any remaining steam within the pot then condenses on the interior surface of the lid where it runs to a gutter (not shown) at the bottom of the lid and one end of the gutter communicates with a pipe leading to the valve 22. Thus, the live steam as well as the condensed moisture flows through the same valve to the compartment 62. Any condensed moisture present in the lower end of the dead-weight valve 24 or in the pressure gauge 28 or relief valve 27 will be relieved through the pipe 26 into the same compartment 62. Any and all steam reaching this compartment is immediately condensed due to the fact that the latter is maintained at a fairly low temperature, i.e., away from the heated pot and in addition, there is a vent 66 leading horizontally outward from the compartment to the outside air. It will be noted that the condensation within the compartment 62 takes place very rapidly so that there is no opportunity for any steam pressure to be developed therein and, therefore, no steam can return to the pot through the pipe 23 and the valve 22. Thus, when the next batch of food is placed in the fat and the lid closed and hermetically sealed, there is practically no moisture therein and no steam formed thereby left over from the previous batch.

This is of advantage to the operator in not only being assured that the food is not overly cooked by steam and consequently fried less, but it also prevents any carry-over of odor from a previous batch of food to the succeeding batch. Finally, the absence of excess moisture brought about by the improved condensing apparatus which prevents re-entry of the ejected steam into the pot, permits greater accuracy in the control of the frying operation. In other words, there are less variable factors which are difficult to control and which, under extreme conditions, may prevent strict uniformity in the fried product.

In order to complete the description it is necessary to state that all of the electrical conductors that supply electrical energy to the motor 33 and the solenoid 21, which is controllable from the instrument panel, are encased in metal tubing 67 in order to keep the wires free from water or condensed moisture.

From the foregoing it is evident that I have disclosed an improved frying apparatus which includes a built-in oil filtering system ready for use by proper manipulation of the drain valve 9 and the return valve 35, and also a system for permanently getting rid of excess steam and moisture by a condensing system, both of which features serve to enhance the quality of the fried product.

It will be understood that various modifications and arrangements in structure could be made without departing from the spirit of my invention and, accordingly, I desire to comprehend such modifications and substitutions of equivalents as may be considered to come within the scope of the appended claim.

What is claimed is:

A filtering system for a deep fat pressure fryer having a pot in which oil is heated to a frying temperature range, said pot having a bottom that slopes to a lowermost portion thereof, there being a drain opening at said lowermost portion, said system comprising a drain pipe extending vertically downwardly from said lowermost portion, the upper end of said pipe being connected to said pot and communicating with the interior thereof, a main valve in said drain pipe in spaced relation to the bottom of said pot, an open-top compartment below the lower end of said drain pipe that is adapted to receive the heated oil from said pot through said drain pipe upon the opening of said main valve, a filter in the bottom of said compartment, a motor driven pump, a first pipe extending upwardly out of said filter to said pump, a second pipe connecting said pump to said drain line at a place between said main valve and the bottom of said pot, and a secondary valve in said second pipe between said pump and said drain, whereby with the heated oil in said compartment, the main valve closed, and the secondary valve open the heated oil is adapted to be pulled through the filter and returned to the pot through said first pipe, said pump and said second pipe, rising up through the drain opening and up into said pot to build up the oil level therein without splashing.

References Cited in the file of this patent

UNITED STATES PATENTS

| | | |
|---|---|---|
| 2,287,396 | Roth | June 23, 1942 |
| 2,546,163 | McBeth | Mar. 27, 1951 |
| 2,578,129 | Daugherty | Dec. 11, 1951 |
| 2,610,740 | Hunter | Sept. 16, 1952 |
| 2,622,591 | Bramberry | Dec. 23, 1952 |
| 2,780,984 | Kleeman | Feb. 12, 1957 |
| 2,914,063 | Wagner | Nov. 24, 1957 |